(12) United States Patent
Oldfield et al.

(10) Patent No.: US 12,205,490 B2
(45) Date of Patent: Jan. 21, 2025

(54) APPARATUS FOR SIMULATING RADIO-GUIDED SURGERY

(71) Applicant: Lightpoint Surgical Ltd, Amersham (GB)

(72) Inventors: Francesca Oldfield, Amersham (GB); Kunal Vyas, Amersham (GB); David Tuch, Amersham (GB); Stewart Forbes, Amersham (GB)

(73) Assignee: Lightpoint Surgical Ltd, Amersham (GB)

( * ) Notice: Subject to any disclaimer, the term of this patent is extended or adjusted under 35 U.S.C. 154(b) by 682 days.

(21) Appl. No.: 17/464,556

(22) Filed: Sep. 1, 2021

(65) Prior Publication Data

US 2021/0398454 A1 Dec. 23, 2021

Related U.S. Application Data

(63) Continuation of application No. PCT/GB2020/050496, filed on Mar. 2, 2020.

(30) Foreign Application Priority Data

Mar. 4, 2019 (GB) ...................... 1902890

(51) Int. Cl.
G09B 23/28 (2006.01)
G09B 23/30 (2006.01)
(52) U.S. Cl.
CPC ........... *G09B 23/285* (2013.01); *G09B 23/30* (2013.01)
(58) Field of Classification Search
CPC .................. G09B 23/30; G09B 23/285
See application file for complete search history.

(56) References Cited

U.S. PATENT DOCUMENTS

| 5,932,879 | A | 8/1999 | Raylman et al. |
| 6,544,041 | B1* | 4/2003 | Damadian ............ G09B 23/285 |
| | | | 600/416 |
| 7,865,230 | B1 | 1/2011 | Sevick-Muraca et al. |
| 2007/0200058 | A1 | 8/2007 | Rice et al. |

(Continued)

FOREIGN PATENT DOCUMENTS

WO 2016/074061 A1 5/2016

OTHER PUBLICATIONS

GB1902890.1, "GB Search Report", Sep. 2, 2019, 6 pages.
PCT/GB2020/050496, "PCT Search Report and Written Opinion", May 8, 2020, 15 pages.

*Primary Examiner* — Jay Trent Liddle
*Assistant Examiner* — Alyssa N Brandley
(74) *Attorney, Agent, or Firm* — Kilpatrick Townsend & Stockton LLP

(57) ABSTRACT

The present application provides apparatus for simulating radio-guided surgery using a light source (8) and a probe (13) having a light detector (16). Specifically, the apparatus includes a subject model (1) that has an enclosure (6) with an opening (4, 5) that extends from an exterior of the subject model (1) into the enclosure (6). The subject model (1) also includes a light source (8) that is disposed within the enclosure (6). The apparatus also includes a probe (13) for deployment by a user through the opening (4, 5) into the enclosure (6). The probe (13) has a light detector (16) configured to detect light emitted by the light source (8) for localization of the light source (8) within the enclosure (6).

19 Claims, 14 Drawing Sheets

(56) References Cited

U.S. PATENT DOCUMENTS

| | | |
|---|---|---|
| 2014/0212860 A1 | 7/2014 | Bai et al. |
| 2014/0349266 A1* | 11/2014 | Choi .................... G09B 23/303 |
| | | 434/272 |
| 2016/0170035 A1* | 6/2016 | Yarnall .................... A61B 6/12 |
| | | 600/436 |
| 2017/0249872 A1 | 8/2017 | Piron et al. |
| 2018/0197441 A1 | 7/2018 | Rios et al. |
| 2018/0301064 A1* | 10/2018 | Hofstetter ............ G09B 23/285 |

\* cited by examiner

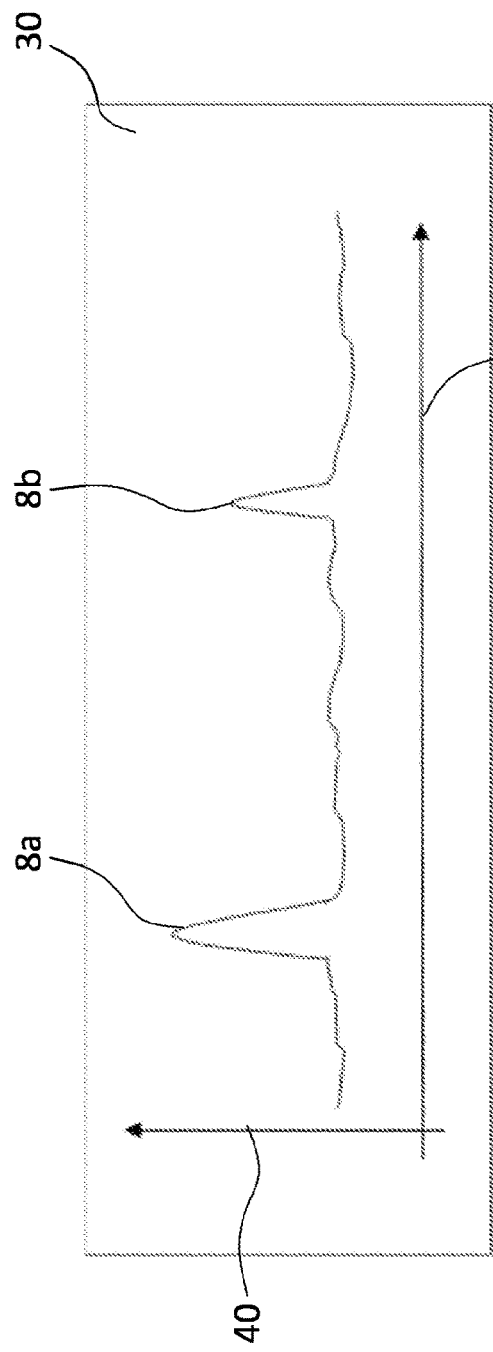
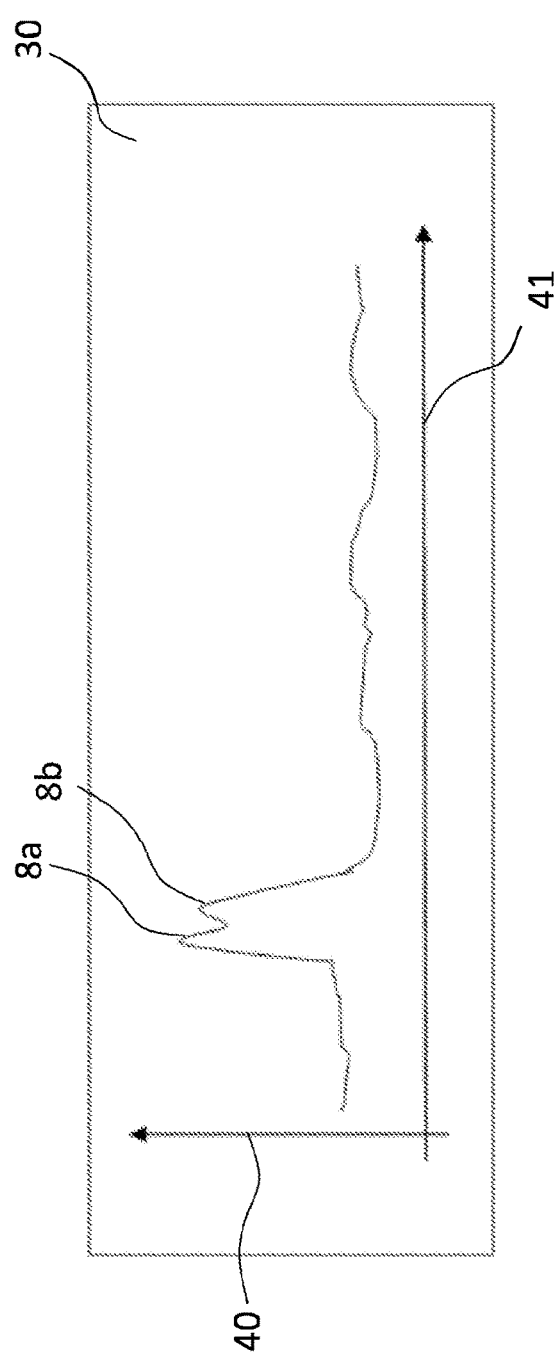
FIG. 12A
FIG. 12B

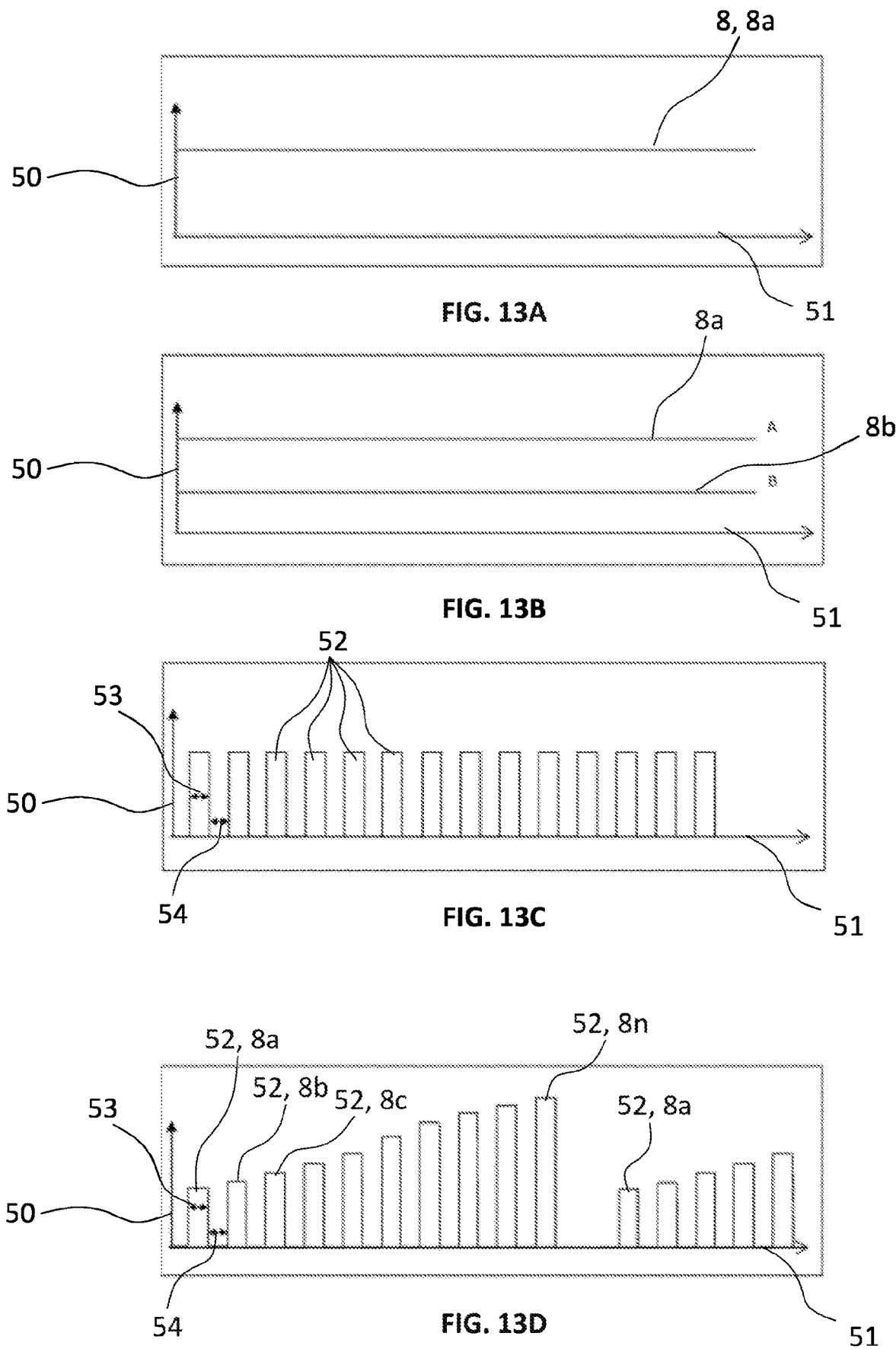

APPARATUS FOR SIMULATING
RADIO-GUIDED SURGERY

CROSS-REFERENCES TO RELATED
APPLICATIONS

This application claims priority to and is a continuation of International Patent Application No. PCT/GB2020/050496, filed Mar. 2, 2020, which claims priority to GB Patent Application No. 1902890.1, filed Mar. 4, 2019, the entire contents of which are hereby incorporated by reference in their entirety for all purposes.

BACKGROUND OF THE INVENTION

This invention relates to apparatus for simulating radio-guided surgery, and to a method of simulating radio-guided surgery.

Radio-guided laparoscopic surgery involves dosing the patient with a radiopharmaceutical, which is carried through the body and binds to specific organs, tissues and cells according to the specific radiopharmaceutical. Typically, the radiopharmaceutical is configured to bind to cancerous tissue or in specific areas, for example in lymph nodes. The radiopharmaceutical emits gamma radiation that can be detected by a probe during laparoscopic surgery to facilitate localization of the specific organs, tissues and cells. The laparoscopic probe includes a radio-detector to detect the source of the radiation.

It is known to provide simulation aids for training in laparoscopic surgery that comprise an enclosure with a series of holes that mimics a patient's body during laparoscopic surgery. A user can insert one or more probes through the holes into the enclosure in order to simulate use of the laparoscopic probes. In training examples, different objects can be placed within the enclosure for practicing surgical procedures.

However, such simulation aids are not suitable for simulating radio-guided laparoscopic surgery because of difficulties associated with using radioactive substances. Existing simulation aids are not adapted to hold a radioactive isotope within the enclosure, and the use of radioactive substances is a highly regulated and restricted activity. Typically, radiopharmaceuticals are only permitted to be used in certain locations, such as radiation controlled areas in hospitals, and this is not always suitable for training purposes. Moreover, use of radiopharmaceuticals or other radioactive materials is expensive because of the cost of the materials and the cost of the licensing and regulation associated with the storage and use of such radioactive materials.

SUMMARY OF THE INVENTION

In accordance with the present disclosure there is provided apparatus for simulating radio-guided surgery, the apparatus comprising:
  a subject model comprising an enclosure having an opening that extends from an exterior of the subject model into the enclosure, and a light source disposed within the enclosure, and
  a probe for deployment by a user through the opening into the enclosure, the probe comprising a light detector configured to detect light emitted by the light source for localization of the light source within the enclosure.

The light source is preferably configured to emit light in the near infrared range. In some examples, the light source is configured to only emit light in the near infrared range. For example, the light source may be configured to emit light having a wavelength between 750 nanometers and 1400 nanometers, preferably between 850 nanometers and 1100 nanometers, preferably about 950 nanometers.

The light source may comprise a light emitting diode. The light source may be embedded in a material that is transparent or translucent to the wavelength of light emitted by the light source. In some examples, the transparent or translucent material may comprise a scattering agent to scatter light emitted by the light source.

The subject model may comprise a plurality of light sources disposed within the enclosure. At least some of the plurality of light sources may be grouped into a cluster of light sources.

Preferably, the light detector is configured to detect light in the same range of wavelength as the light emitted by the light source. For example, the light detector may be configured to detect light in the near infrared range. In one example, the light detector is configured to only detect light in the near infrared range. For example, the light detector may be configured to detect light having a wavelength between 750 nanometers and 1400 nanometers, preferably between 850 nanometers and 1100 nanometers, preferably about 950 nanometers. Preferably, the light detector is configured to generate a peak response when detecting light having a wavelength of approximately 950 nanometers. The light detector may comprise a silicone photodiode.

The probe may comprise a light filter to filter light before it is incident on the light detector. The light filter may be a visible light filter to filter out visible light.

In examples, the probe comprises a probe head for deployment by a user through the opening into the enclosure. The probe may further comprise a tether attached to the probe head. The light detector may be located in the probe head. The probe may further comprise a mechanism for moving the light detector within the probe head.

For example, the probe head may comprise an elongate body having a window at one end, and the light detector may be arranged to face the window. In this example, the mechanism may be arranged to move the light detector axially to alter the distance between the light detector and the window.

In an alternative example, the probe head may comprise a casing having a side wall and a window formed in the side wall, and the light detector may be arranged to face the window. In this example, the mechanism may be arranged to rotate the light detector relative to the casing.

In an alternative example, the probe head may comprise an aperture component positionable between the light detector and the window, the aperture component having an aperture that defines the field of view of the light detector. The aperture component may be changeable for a different aperture component having a different size aperture, to alter the field of view of the light detector.

The probe head may further comprise a grip for manipulation by a user.

In some examples, the apparatus further comprises a second probe for deployment by a user through the opening into the enclosure. The second probe may comprise a camera for capturing images from within the enclosure. Additionally or alternatively, the second probe may further comprise a visible light source configured to emit visible light. Preferably, the visible light source is configured such that no light is emitted in the near infrared range.

The subject model may comprise a model anatomical feature disposed within the enclosure. For example, the model anatomical feature may comprise one or more of a model organ, a model blood vessel, a model skeletal feature, a model feature of the nervous system, and/or a model lymph node.

The light source may be disposed in the model anatomical feature. In some examples, a plurality of light sources are disposed in the model anatomical feature. For example, one or more light sources may be embedded within the model anatomical feature. Alternatively, one or more light sources may be mounted on the model anatomical feature.

The subject model may comprise a base and a cover that define the enclosure. In examples, the cover is removable from the base. Preferably, the cover is anthropomorphic, for example shaped like a human torso. The opening may be formed in the cover. The cover may comprise a plurality of openings. The plurality of openings may be to simulate laparoscopic surgery. Alternatively, the cover may comprise a single opening to simulate open surgery. The single opening may have a size for insertion of a plurality of surgical tools into the enclosure.

The subject model may comprise a light control unit configured to control the light source. The light source may be controlled according to an activation profile of the light control unit.

In some examples, the light control unit may be configured to activate the light source such that the light source emits a constant intensity light.

In other examples, the subject model comprises a plurality of light sources and the light control unit is configured to activate the plurality of light sources such that each of the plurality of light sources emits light at a constant intensity.

In some examples, the light control unit is configured such that a first light source of the plurality of light sources is activated at a different intensity to a second light source of the plurality of light sources.

In preferred examples, the light control unit is configured to vary the intensity of the light emitted by the light source. That is, the light control unit is preferably configured to control the one or more light sources according to a dynamic activation profile. The subject model may comprise a plurality of light sources. In this case, the light control unit may be configured to vary the intensity of the light emitted by each of the plurality of light sources.

The light control unit may be configured to activate each of the plurality of light sources sequentially. For example, the light control unit may be configured to activate each of the plurality of light sources in sequential pulses. In examples, the duration is less than 10 milliseconds, more preferably less than 5 milliseconds, more preferably approximately 2 milliseconds.

Preferably, the light control unit is configured to provide an interval between the activation of successive light sources, or between successive pulses. In examples, the duration of the interval is less than 10 milliseconds, more preferably less than 5 milliseconds, more preferably approximately 2 milliseconds. In some examples, the peak intensity of a first light source of the plurality of light sources is different to the peak intensity of a second light source of the plurality of light sources. In further examples, the light control unit is configured such that every light source of the plurality of light sources has a different peak intensity when activated.

The probe may further comprise a probe control unit configured to receive a signal indicative of the intensity of light detected by the light detector. The probe control unit may comprise a processor for processing the signal received from the light detector. The processor may be configured to filter out background noise from the signal. For example, the processor may be configured to isolate peaks from the signal.

In some examples, the light control unit is configured to control the light sources using pulse modulation, for example pulse-amplitude modulation or pulse-width modulation. Each light source of the plurality of light sources, or different groups of light sources of the plurality of light sources, may be operated with different pulse modulation. In this way, light sources or groups of light sources can be distinguished from each other. The light control unit may be configured to operate a lock-in technique for the pulse modulation. The probe control unit may be configured to demodulate the signal of the detected light, to distinguish between different light sources with different pulse modulation. In this way, it is possible for the probe control unit to identify a detected light signal. For example, one or more light sources associated with a particular location of the subject model may be provided with a signal having a first pulse modulation, and one or more other light sources may be provided with a signal having a second pulse modulation. By demodulating the detected light signal, the probe control unit can distinguish between the different light sources, and thus can determine the position of the light source.

The probe control unit may further comprise a communicator configured to communicate an output to a user. In examples, the communicator is a visual display configured to display a magnitude of the intensity of the light detected by the light detector. For example, the display may be configured to display the magnitude of the light detected by the light detector across a field of view of the light detector. Alternatively, or additionally, the display may be configured to display the magnitude of the light detected by the light detector according to a time. In other examples, the communicator comprises a loudspeaker configured to emit a sound indicative of the intensity of the light detected by the light detector.

In accordance with a further aspect of the present disclosure, there is provided a subject model for simulating radio-guided surgery, the subject model comprising an enclosure, an opening that extends from an exterior of the subject model into the enclosure for deployment of a probe into the enclosure, and a light source disposed within the enclosure for localization by a user using the probe.

The subject model may have any of the additional features described above.

In accordance with a further aspect of the present disclosure, there is provided a probe for simulating radio-guided surgery, the probe comprising a probe head shaped for insertion through an opening into an enclosure of a subject model, the probe head comprising a light detector for localization of a light source disposed within the enclosure of the subject model.

The probe may have any of the additional features described above. The probe may be a laparoscopic probe. The laparoscopic probe may comprise a tether.

In accordance with a further aspect of the present disclosure, there is provided a method of simulating radio-guided surgery, the method comprising:
providing the apparatus described above, in particular the subject model and the probe,
activating the light source within the subject model,
inserting the probe through the opening and into the enclosure of the subject model, and
using the probe to determine the location of the light source within the enclosure.

Determining the location of the light source within the enclosure may further comprise moving the probe to detect light from a different position.

In some examples, the method is a method of training in surgery, for example radio-guided laparoscopic surgery or radio-guided open surgery. In other examples, the method is a method of testing radio-guided surgery equipment and/or processes, for example radio-guided laparoscopic equipment and/or processes, or radio-guided open surgery equipment and/or processes. In some examples, the method is a method of demonstrating equipment and/or processes for radio-guided surgery, for example radio-guided laparoscopic surgery or radio-guided open surgery.

According to an embodiment of the present invention, a method of simulating radio-guided surgery is provided. The method includes providing the apparatus of any of the embodiments described herein and activating the light source within the subject model. The method also includes inserting the probe through the opening and into the enclosure of the subject model and using the probe to determine the location of the light source within the enclosure.

It will be understood that any data processing can be performed by a device having one or more processors and a memory including instructions to cause the one or more processors to perform the data processing. The memory is typically a non-transient computer-readable storage medium.

BRIEF DESCRIPTION OF THE DRAWINGS

Embodiments of the invention are further described hereinafter with reference to the accompanying drawings, in which:

FIGS. 12A and 12B show example visual displays of the probe control unit; and

FIGS. 13A to 13D show example activation profiles of the light control unit.

DETAILED DESCRIPTION OF THE INVENTION

Figure 1B:
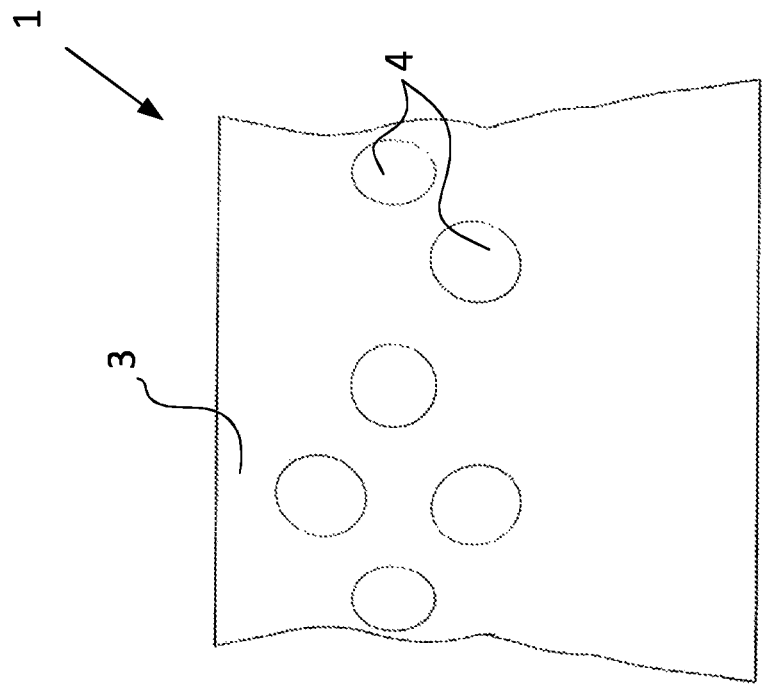
FIGS. 1A and 1B are views of the subject model having a first example cover.
Figure 1A:
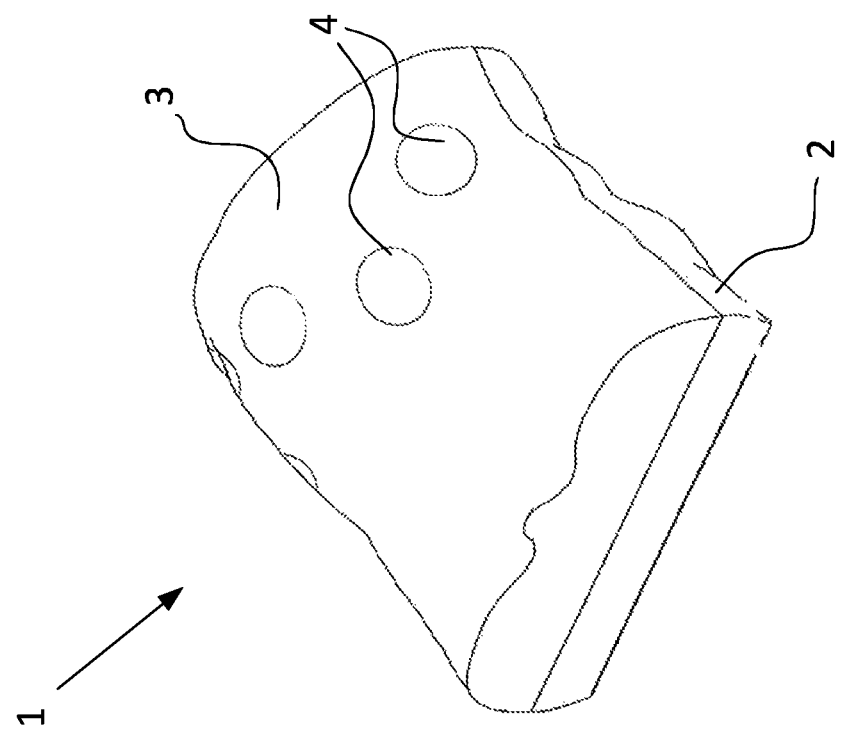

As illustrated in FIGS. 1A to 3B, the subject model 1 includes an enclosure 6 that is formed between a base 2 and a cover 3. In the example of FIGS. 1A and 1B, the cover 3 includes a plurality of openings 4 that extend from an exterior of the subject model 1 into the enclosure 6. The plurality of openings 4 simulate laparoscopic surgery, where a plurality of incisions are formed in a patient for multiple laparoscopic surgical tools. Each opening 4 may have a size (diameter) of between 10 mm and 30 mm such that a single laparoscopic probe can be inserted through each opening 4. One or more of the openings 4, 5 can be provided with a trocar to more closely simulate real-life surgical conditions. Additionally or alternatively, one or more of the openings 4, 5 may have a flexible edge, for example an edge insert made of silicon or rubber. Such a flexible edge may mimic human skin. The openings 4 shown in FIGS. 1A and 1B may be arranged to mimic the positions of laparoscopic probe entry during one or more laparoscopic procedures.

Figure 2B:
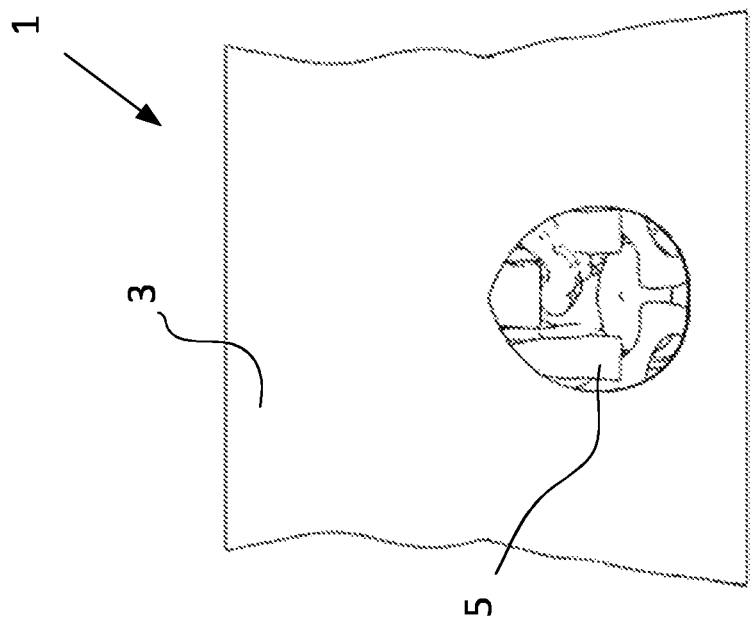
FIGS. 2A and 2B are views of the subject model having a second example cover.
Figure 2A:
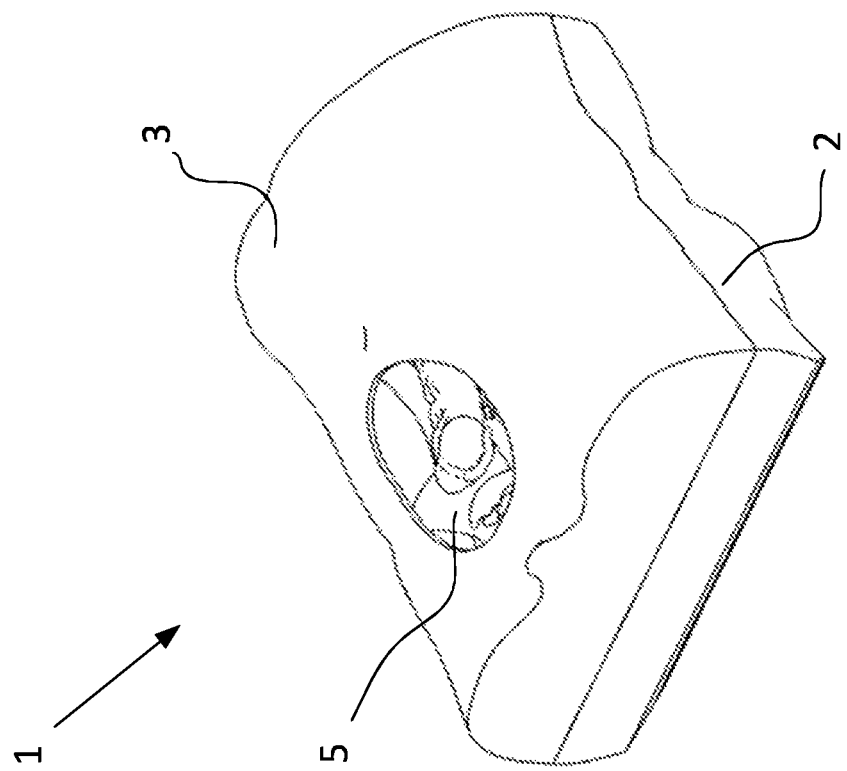

In the example of FIGS. 2A and 2B, the cover 3 comprises a single opening 5 through the cover 3 into the enclosure 6. The single opening simulates open surgery, where the opening 5 is large enough to allow multiple surgical tools to be used through the single opening 5. The opening 5 is larger than the plurality of openings 4 in the example of FIGS. 1A and 1B, for example the opening 5 may have a diameter up to 50 mm, so that multiple surgical tools can be inserted into the enclosure 6 through the single opening 5. The opening 5 can be provided with a trocar to more closely simulate real-life surgical conditions.

In each example of FIGS. 1A to 2B the base 2 and cover 3 completely close the enclosure 6 except via the opening 5 or openings 4. That is, the base 2 and cover 3 each comprise walls that extend on all sides of the subject model 1, such that as much light as possible is prevented from entering the enclosure 6.

As illustrated, in preferred examples the subject model 1 is an anthropomorphic phantom. That is, the subject model 1 is shaped to resemble a human body, in these examples the abdomen of a human body. However, it will be appreciated that the outer form of the subject model 1, in particular the cover 3, does not have to be anthropomorphic, and can alternatively be a simple box or other shaped enclosure.

Figure 3A:
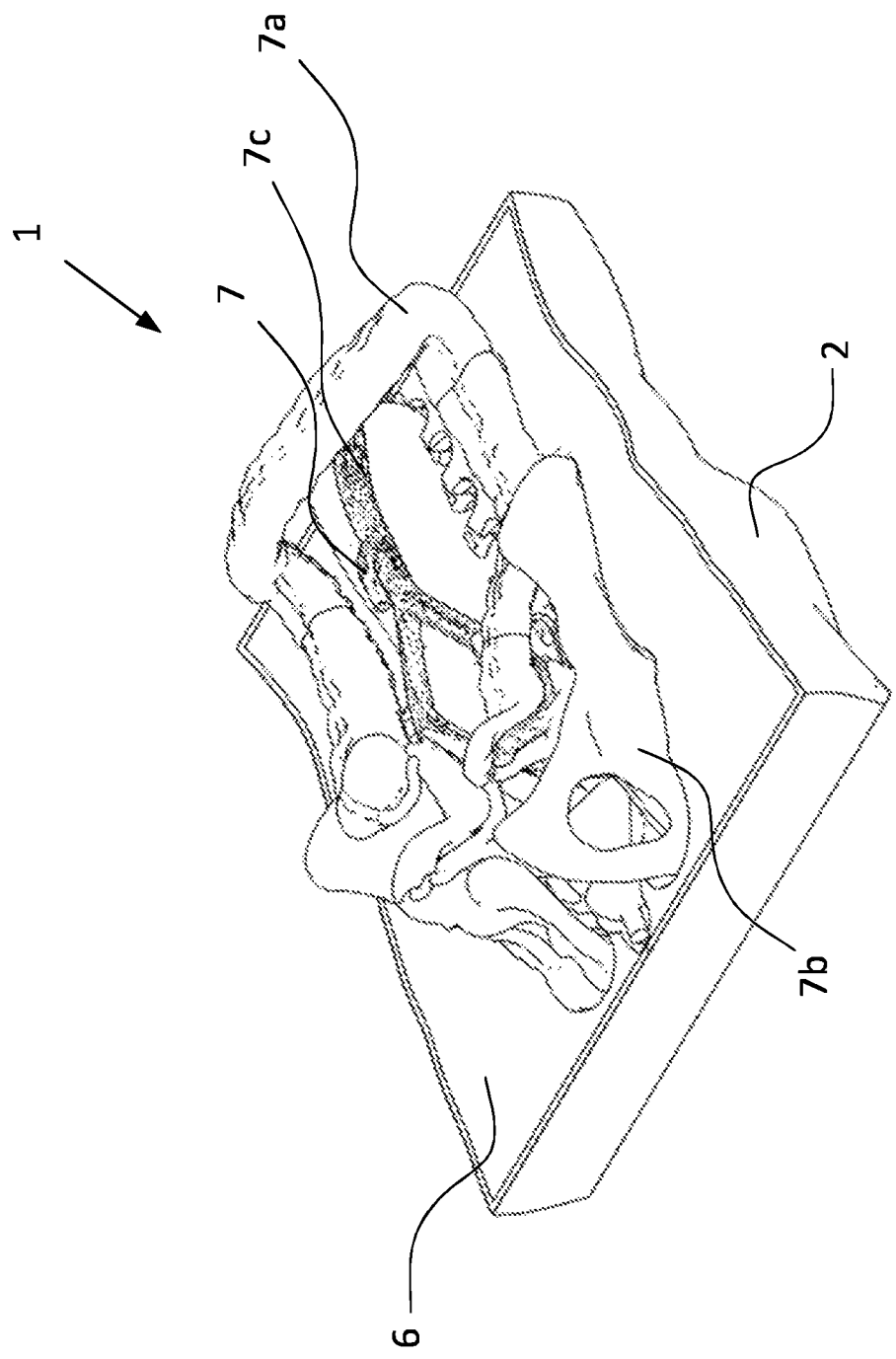
FIGS. 3A and 3B show the subject model of FIGS. 1A to 2B with the cover removed.
Figure 3B:
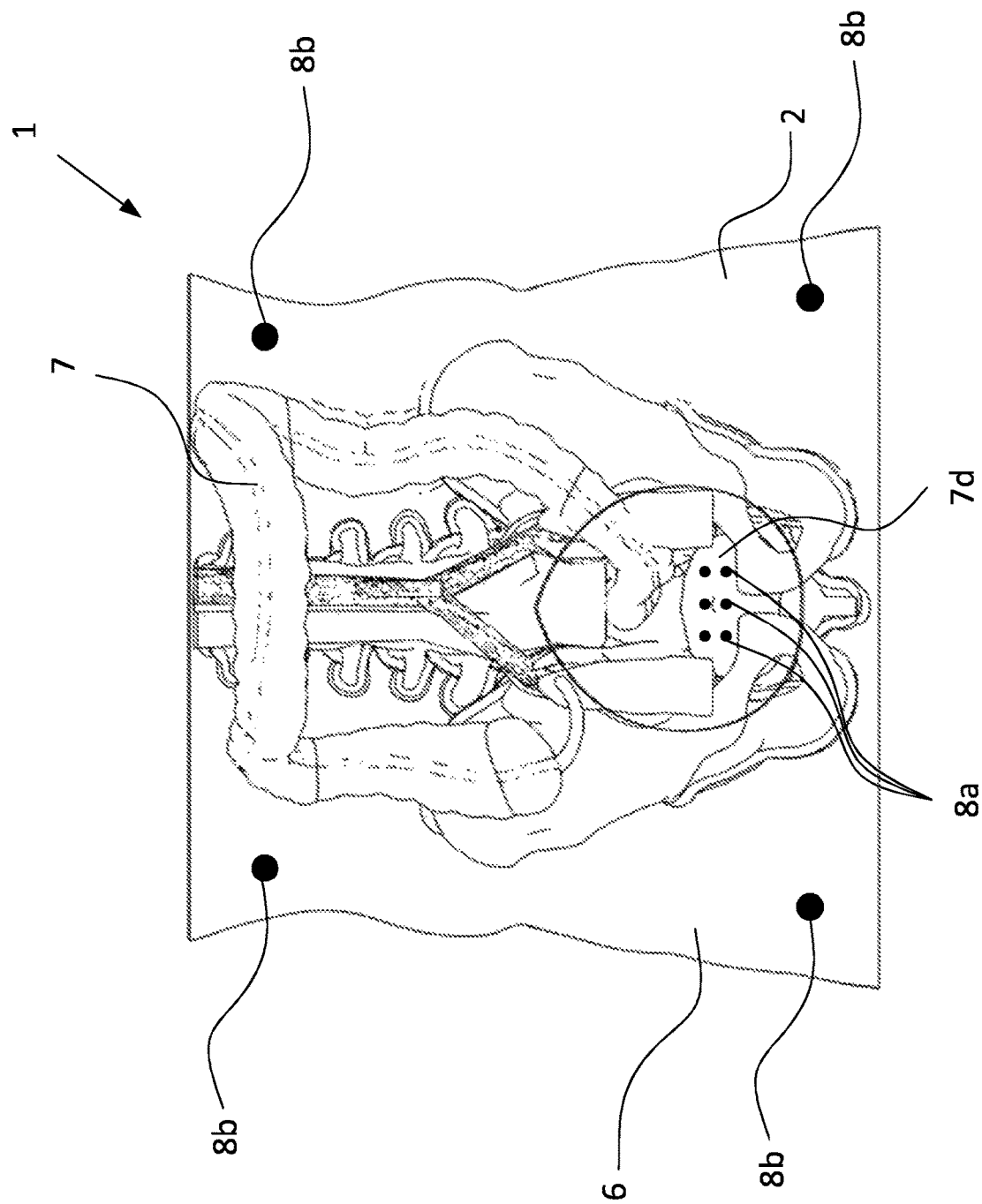

The cover 3 is preferably openable to provide access to the enclosure 6. In the examples of FIGS. 3A and 3B the cover 3 is removable from the base 2. In examples, the cover 3 may be secured to the base 2 by clips, or by fixings, such as screws. Alternatively or additionally, the cover 3 may be hingedly attached to the base 2.

The base 2 and cover 3 are preferably made of a rigid material, for example plastic. Plastic is preferable as it can be easily molded or printed to the required shape.

In laparoscopic surgery the abdomen is typically inflated using a gas, usually carbon dioxide, to create spaces within the abdomen between body parts. The cover 3 of the subject model 1 of FIGS. 1A to 2B is preferably shaped to simulate this inflated state. That is, the cover 3 is spaced from the internal contents of the enclosure, as explained further hereinafter.

FIG. 3A shows the base 2 and the contents of the enclosure 6. As illustrated, in this example the subject model 1 comprises model internal anatomical features 7. In particular, as illustrated in FIG. 3A, the subject model comprises model organs 7a, model skeletal features 7b (e.g. pelvis), model blood vessels 7c, model nervous system features, and models of other anatomical features. The model internal anatomical features 7 are mounted to the base 2 such that they are disposed within the enclosure 6 when the cover 3 is in position. As explained above, the cover 3 is preferably shaped so as to be spaced from the model internal anatomical features 7 to simulate an inflated abdomen, as is typical in laparoscopic surgery. In the example of FIGS. 2A and 2B, the cover 3 may be shaped to simulate an abdomen during open surgery, in which case the abdomen is not usually inflated.

In some examples, the model anatomical features 7 are configured to simulate a range of human anthropomorphic dimensions and severity of illness. For example, the model anatomical pelvis 7b may be particularly large, and/or with particularly small openings, compared to an average human pelvis, so that the simulated surgical environment is more challenging. In other examples, a model organ 7a may have an increased size or altered position.

The subject model 1 preferably includes the model internal anatomical features 7 so that use of the subject model 1 more closely simulates real life surgery. However, it will be appreciated that the model internal anatomical features 7 are optional and the subject model 1 would function in simulating radio-guided surgery without them. In addition, the subject model 1 may comprise more or fewer model internal anatomical features 7. In some examples, the subject model 1 may comprise some detailed model internal anatomical features 7, as illustrated, and some less detailed model internal anatomical features (e.g. a box). This may be advantageous if the subject model 1 is intended for use in simulating a particular type of surgery, for example simulating surgery related to the bladder may not require a detailed anatomical model of the intestine.

In examples, one of more of the model internal anatomical features 7 may be shaped to simulate a medical condition of that model internal anatomical feature 7. For example, one or more of the model internal anatomical features 7 may comprise a protrusion that simulates a tumor.

As illustrated in FIG. 3B, the subject model 1 comprises one or more light sources 8 disposed within the enclosure. In the illustrated example, light sources 8a are disposed on one or more of the model internal anatomical features 7. For example, in the illustrated example light sources 8a are disposed on the model bladder 7d. Further light sources 8b are mounted on the base 2, within the enclosure 6.

In examples, a plurality of light sources 8 may be arranged in a cluster in a particular area of the subject model 1. For example, as illustrated, a plurality of light sources 8a may be arranged in a cluster on the model bladder. It will be appreciated that individual light sources 8 or clusters of light sources 8 may be disposed on any part within the enclosure 6 of the subject model 1, including any of the model anatomical features 7.

Figure 4B:
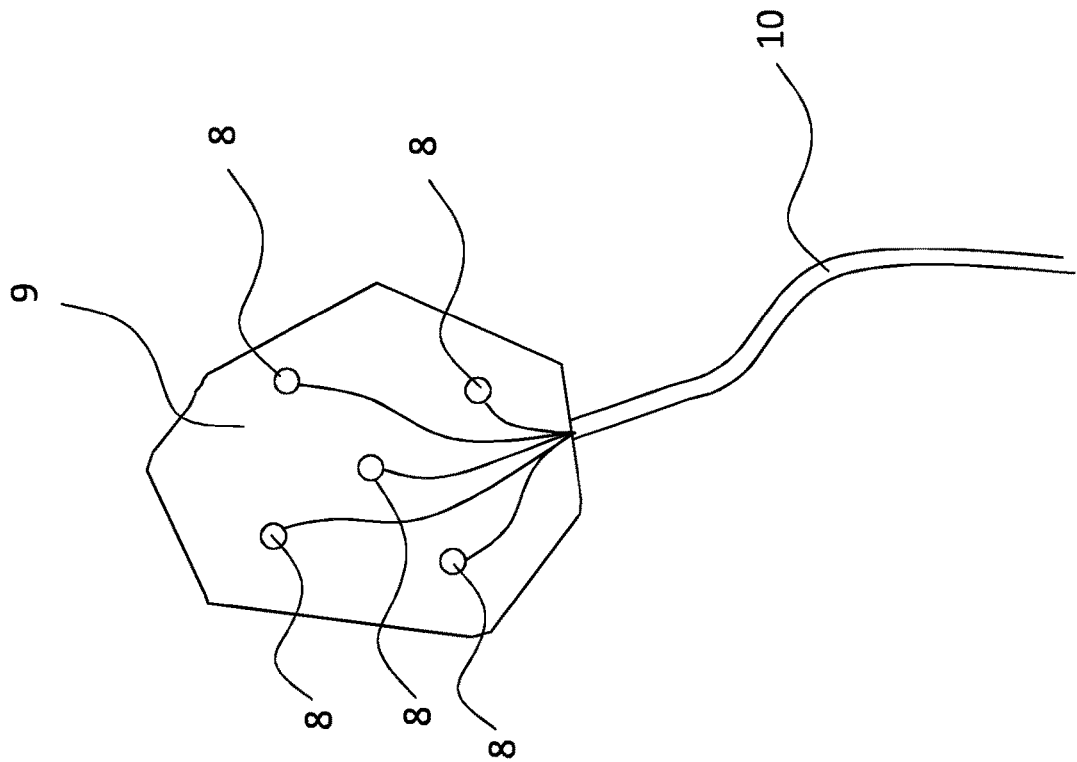
FIGS. 4A and 4B show examples of the light source of the subject model of FIGS. 1A to 3B.
Figure 4A:
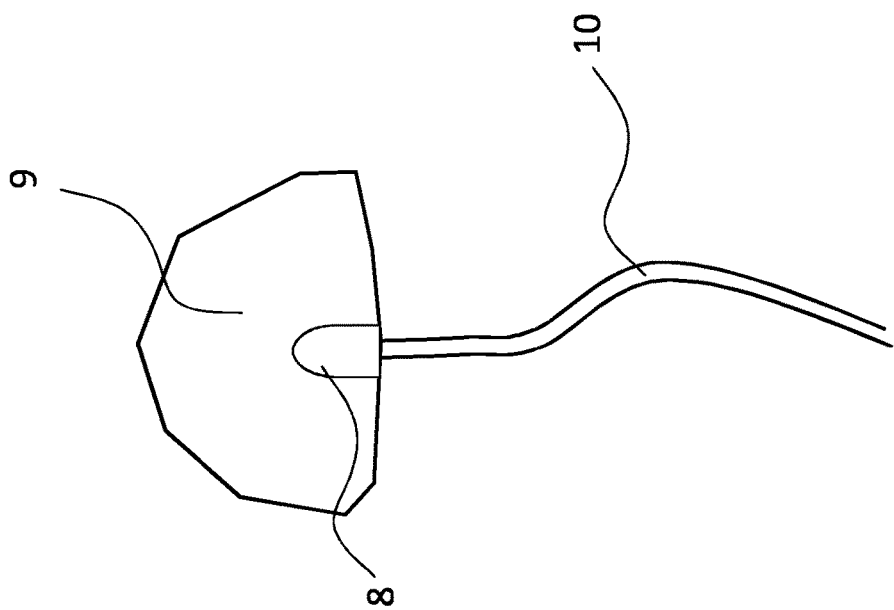

FIGS. 4A and 4B show examples of the light sources 8. In FIG. 4A, a single light source 8 is provided, for example an LED. In this example the light source 8 is embedded in a model 9. The model 9 may be a model internal anatomical feature 7, such as an organ or a lymph node, as previously described. Alternatively, the model 9 may be intended to simulate a tumor or other anatomical feature. The model 9 is positionable within the enclosure 6. The material of the model 9 is transparent or translucent to the wavelength of light emitted by the light source 8 so that the light emitted by the light source 8 reaches the enclosure 6.

In alternative examples, the light source 8 is not embedded in a material, for example a model 9 as per FIG. 4A, but is instead exposed directly to the enclosure 6.

In the example of FIG. 4B, a plurality of light sources 8 are arranged in a cluster. The cluster of light sources 8, for example LEDs, are embedded in a model 9. The model 9 may be a model internal anatomical feature 7, for example a model presacral lymph node. Alternatively, the model 9 may be intended to simulate a tumor or other anatomical feature. The material of the model 9 is transparent or translucent to the wavelength of light emitted by the light sources 8 so that the light emitted by the light sources 8 reaches the enclosure 6.

In examples where the one or more light sources 8 are embedded in a material within the enclosure 6, it is preferable that the material is transparent or translucent to the wavelength of light emitted by the light sources 8 to permit the light to reach the enclosure 6. Also, it is preferable that the material comprises a scattering agent, for example reflective particles distributed through the material, to scatter the light into the enclosure 6. Such scattering will more closely simulate the propagation of gamma radiation in the enclosure 6, simulating radio-guided surgery.

The one or more light sources 8 provided in the enclosure, as shown in FIGS. 3B, 4A and 4B, are preferably LEDs. However, it will be appreciated that other light sources may alternatively be used, for example a filament bulb, or an organic light-emitting diode, a polymer light-emitting diode, an AMOLED, or other electrically power light source.

As illustrated in FIGS. 4A and 4B, the one or more light sources 8 are provided with a wire 10 to provide power input. As explained further hereinafter, the wires 10 preferably extend to a light control unit. However, it will be appreciated that in alternative examples the one or more light sources 8 may be provided with their own power source, for example a battery, and they may additionally be provided with a receiver for remote operation and control.

Figure 5:
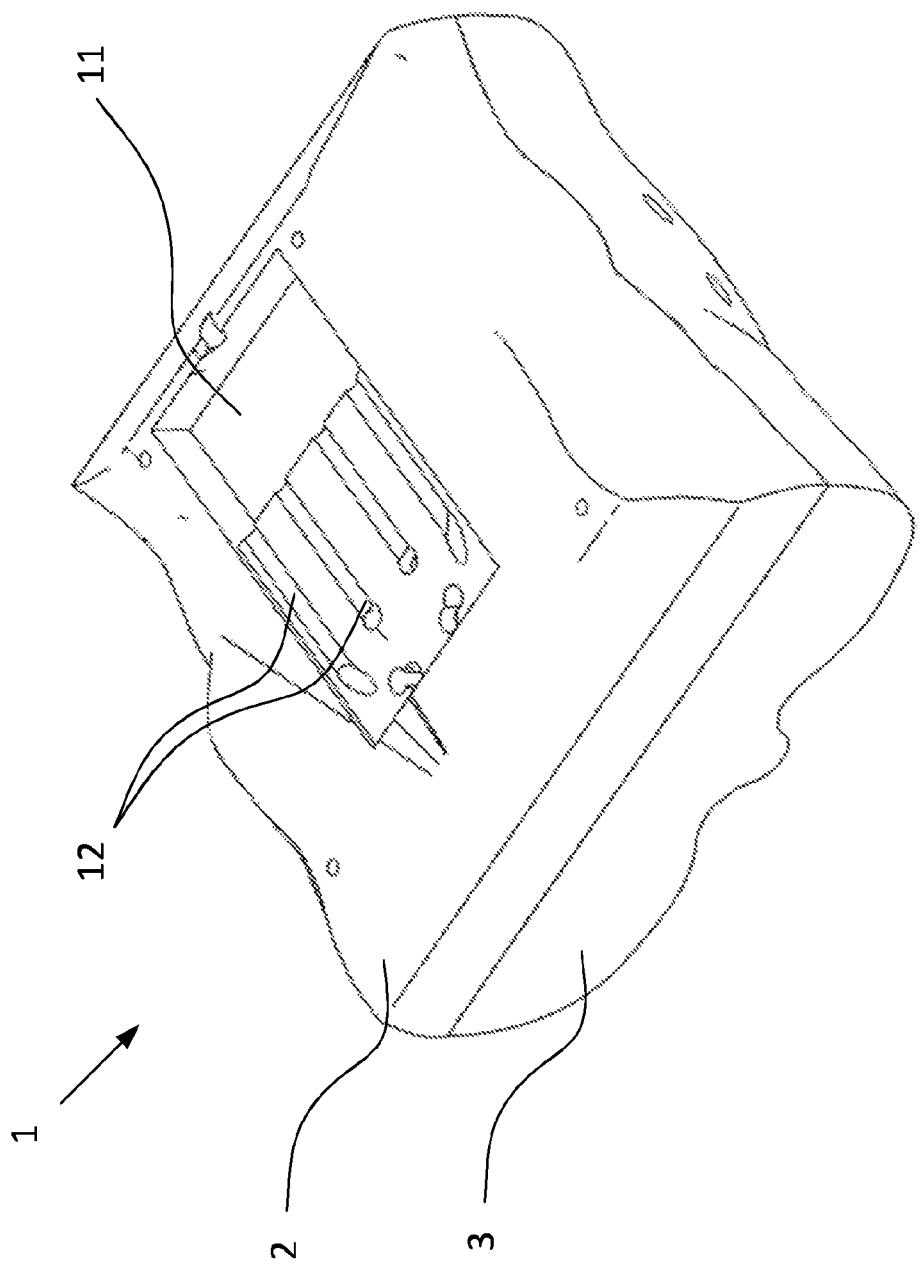
FIG. 5 shows an underside of the subject model of FIGS. 1A to 3B.

FIG. 5 shows an underside of the base 2 of the subject model 1, opposite to the enclosure. As shown, the underside of the base 2 comprises a recess 11 for receiving a light control unit. In the illustrated examples, the light control unit is connected to the one or more light sources 8 within the enclosure 6 via wires 10 (see FIGS. 4A and 4B). The wires 10 extend through the wire paths 12 in the base 2 between the recess 11 and the enclosure 6. The wire paths 12 are preferably plugged or otherwise sealed to prevent ingress of external light into the enclosure 6 through the wire paths 12, around the wires 10. Additionally or alternatively, a cover can be provided over the recess 11 and wire paths 12 to block external light. The light control unit may be connected to an external power source, for example mains electricity, via a wire. Alternatively, the recess 11 may be sized to also receive a battery for powering the light control unit and the one or more light sources 8.

In various examples, one or more light sources 8 are disposed within the enclosure 6 of the subject model 1. In examples where the enclosure 6 comprises a model internal anatomical feature 7, as illustrated in FIGS. 3A and 3B, the one or more light sources 8 may be embedded in, or attached to, a model internal anatomical feature 7. Alternatively or additionally, one or more light sources 8 may be attached to the cover 3 or base 2 of the subject model 1. In examples where no model internal anatomical features 7 are provided in the enclosure 6, the one or more light sources 8 may be disposed in the enclosure 6, for example attached to the cover 3 or base 2, or otherwise suspended in the enclosure 6, for example on a support member.

In a particular example, for simulating radio-guided surgery on lymph nodes, the one or more light sources 8 may be arranged in a model lymph node positioned in the presacral space to simulate a presacral tumor.

In addition to the above, one or more light sources 8 may be arranged elsewhere within the enclosure 6, for example the light sources 8b shown in FIG. 3b, to simulate background radiation and other interference that is typical in radio-guided surgery.

In a preferred example, the subject model comprises a plurality of light sources 8 disposed in different locations within the enclosure 6, including in a plurality of locations where radio-guided surgery is carried out (e.g. on the various lymph nodes). As explained below, the plurality of light sources 8 can be controlled by the light control unit to be operated individually or in combination to simulate different types of radio-guided surgery.

In examples, one or more light sources 8 may be disposed on, embedded in, or in the model position of: the appendix, the gallbladder, the liver, the pancreas, the small intestine, the large intestine, the spleen, the stomach, the pelvic area, the reproductive organs, and/or other anatomical features of the abdomen. In addition, as explained above, one or more further light sources 8 may be disposed in other areas of the enclosure to simulate background radiation and interference.

Figure 6:
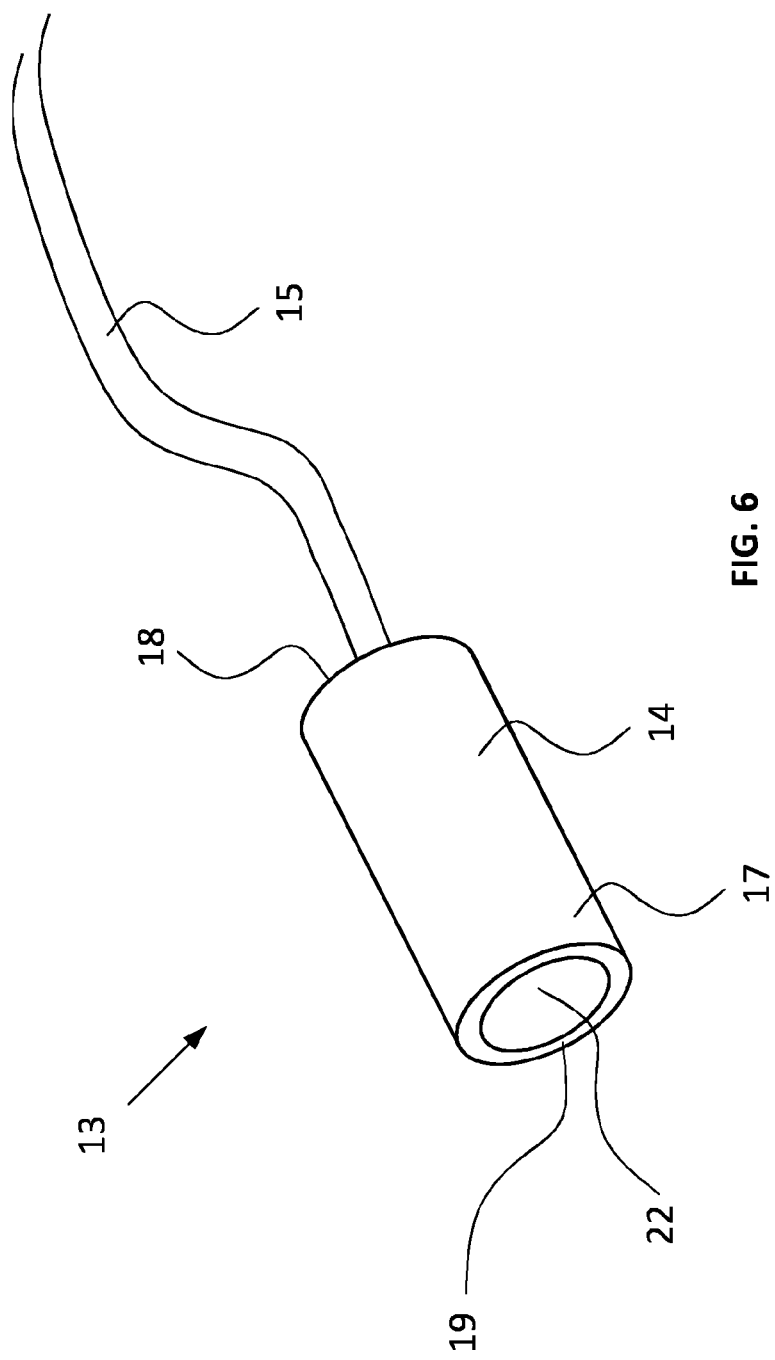
FIG. 6 shows a laparoscopic probe.

The probe 13 shown in FIG. 6 is a tethered probe, and is similar to a radio-guided laparoscopic probe, as explained further below. The probe 13 comprises a probe head 14 and a tether 15, and during use with the subject model 1 described above the probe head 14 is inserted into the enclosure 6 through an opening 4, 5 in the cover 3. This simulates use of a radio-guided probe in real life surgery, where the probe head is placed in the body cavity through an incision made in the patient's abdomen, either for laparoscopic surgery (FIGS. 1A and 1B, or for open surgery FIGS. 2A and 2B).

The tether 15 provides physical and electronic connection to the probe head 15. As explained further hereinafter, the tether 15 extends to a probe control unit. In examples, the probe head 14 may comprise a grip or a socket that allows a further tool to be attached to the probe head 14 for moving the probe head 14 within the enclosure 6. The grip may be beveled. The grip may be magnetic.

A radio-guided probe for use in real life surgery would comprise a gamma ray detector for detecting gamma rays emitted by the radiopharmaceutical so that the location of the radiopharmaceutical can be determined. As explained further hereinafter, the probe 13 of the present invention comprises a light detector to detect light emitted by the one or more light sources 8 in the subject model 1. The probe 13 with a light detector can be used to determine the location of the one or more light sources 8 within the enclosure 6, thereby simulating radio-guided localization using a probe.

Figures 7A, 7B:
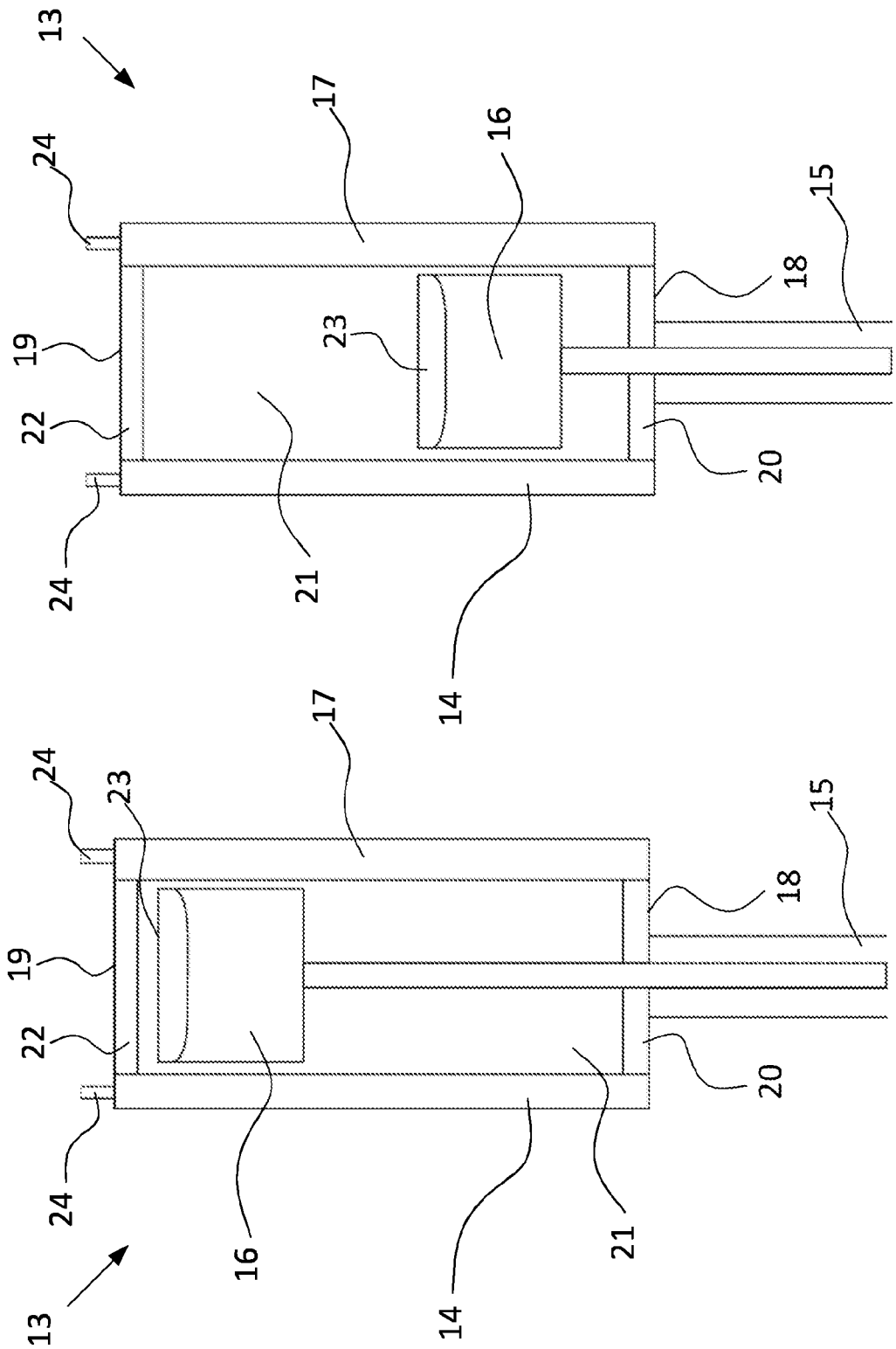
FIGS. 7A and 7B show cross-sectional views of a first example of the laparoscopic probe of FIG. 6.

FIGS. 7A and 7B illustrate the probe 13 of FIG. 6, with a light detector 16. As shown, the probe head comprises a casing 17. In this example, as shown in FIG. 6, the casing 17 is cylindrical having a first end 18 and a second end 19. The tether 15 is attached to the first end 18 of the casing 17, which is closed with an opaque covering 20. The casing 17 comprises a chamber 21 defined within the casing 17 and between the first and second ends 18, 19. The second end 19 of the casing 17 comprises a window 22. The window 22 is transparent or translucent to permit light to enter into the chamber 21 of the casing 17 through the window 22.

The light detector 16 is disposed within the casing 17, in the chamber 21. The detective surface 23 of the light detector 16 is directed towards the window 22. In this way, light entering into the chamber 21 through the window 22 is detected by the light detector 16.

Spacers 24 are preferably provided on the second end 19 of the casing 17. The spacers 24 ensure that a space is maintained between the window 22 and any surface that the probe head 14 abuts, allowing light to enter into the window 22.

As shown in FIGS. 7A and 7B, the light detector 16 is movable within the casing 17 of the probe head 14. In particular, the light detector 16 is movable towards and away from the window 22, in an axial direction of the probe head 14. Moving the light detector 16 towards and away from the window 22 alters the field of view of the light detector 16, allowing the user to obtain multiple light detections with different fields of view in order to better determine the location of the light source 8. Movement of the light detector 16 towards and away from the window 22 also allows simulation of different radio-guided surgical equipment, or configurations of the equipment, having different fields of view. For example, the position of the light detector 16 can be set such that the field of view of the light detector 16 matches the field of view of an actual radio-guided probe, in order to simulate use of that actual radio-guided probe.

The probe head 14 may further comprise an aperture component that is removably attachable to the probe head 14 for altering the field of view. The aperture component may be attachable between the light detector 16 and the window 22, within the probe head 14. Or, the aperture component may be attachable to an outside of the probe head 14, over the window 22 to alter the effective size of the window 22. The aperture component has an aperture that limits incidence of light on the light detector 16. In these examples, the light detector 16 may have a fixed position within the probe head 14.

In some examples, the internal surface of the chamber 21 within the casing 17 is absorptive to light, particularly near infrared light. For example, the internal surface of the chamber 21 may have a black coating. In this way, less infrared light that enters the chamber 21 via the window 22 is reflected within the casing 17.

Movement of the light detector 16 relative to the window 22 can be facilitated by any suitable means. For example, a mechanism can be provided for moving the light detector 16 within the casing 17 of the probe head 14. In one example, the mechanism may comprise a latched button (such as is often found on pens). The light detector 16 may be spring loaded such that, for example, the light detector 16 is initially arranged in a first position (FIG. 7A) in which the light detector 16 has a first field of view (e.g. a wide first field of view) and, on actuation of the spring loaded mechanism, the light detector 16 is moved from the first position (FIG. 7A) to a second position (FIG. 7B) in which the light detector 16 has a second field of view (e.g. a narrow first field of view).

As another example, the mechanism for moving the light detector 16 within the casing 17 may be a screw thread. For example, the casing 17 can be formed of two concentric sections, one internal and one external, so that they can be mechanically rotated with respect to the other. An internal screw thread between the internal and external parts of the casing 17 would translate this rotation into forward or backward movement. It can be envisaged this can be done with a surgical tool and that two or more stable positions are defined. To facilitate the rotation gripping features can be included on the casing 17 (for example, two textured flats).

Figure 8:
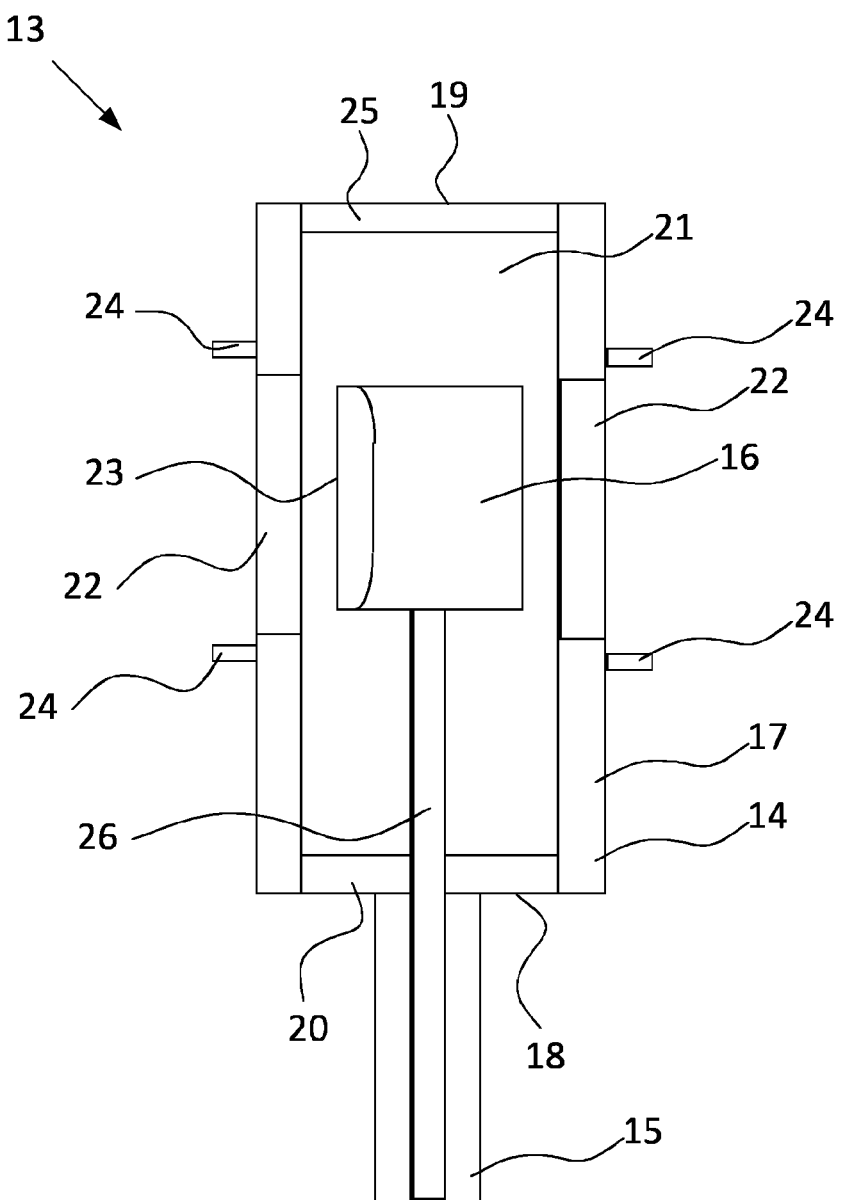
FIG. 8 shows a cross-sectional view of a second example of the laparoscopic probe of FIG. 6.

FIG. 8 illustrates a cross-sectional view of an alternative example of the probe 13 of FIG. 6. Similarly to the example of FIGS. 7A and 7B, the probe head 14 comprises a casing 17. In this example, as shown in FIG. 6, the casing 17 is cylindrical having a first end 18 and a second end 19. The tether 15 is attached to the first end 18 of the casing 17, which is closed with an opaque covering 20. The casing 17 comprises a chamber 21 defined within the casing 17 and between the first and second ends 18, 19. In this example, the second end 19 of the casing 17 is closed with an opaque covering 25. In this example, a side wall of the casing 17 comprises a window 22. The window 22 extends circumferentially about the cylindrical casing 17. The window 22 is transparent or translucent to permit light to enter into the chamber 21 through the window 22.

In some examples, the window 22 extends entirely about the circumference of the probe head 14. In other examples, a plurality of windows 22 are arranged about the circumference of the probe head 14.

A light detector 16 is disposed within the chamber 21. The detective surface 23 of the light detector 16 is directed towards the window 22. In this way, light entering into the chamber 21 through the window 22 is detected by the light detector 16.

Spacers 24 are preferably provided on the circumferential surface of the casing 17, adjacent to the window 22. The spacers 24 ensure that a space is maintained between the window 22 and any surface that the probe head 14 abuts, allowing light to enter into the chamber 21.

In the example of FIG. 8, the light detector 16 is rotatable within the casing 17 to change the field of view of the light detector 16. For example, the light detector 16 can be rotated by a cable shaft 26 (flexible shaft) that extends along the tether 15. Alternatively, the light detector 16 can be rotated by a screw thread or other rotational mechanism, and optionally this can be actuated by a surgical tool.

In some examples, rotation of the light detector 16 within the casing 17 may be measured by a rotational position sensor. The rotation position can be used to determine the field of view of the light detector 16.

In preferred examples, the window 22 comprises a filter. The filter is preferably configured to filter out light that is not within the desired wavelength range, that is, the wavelength range of the light emitted by the one or more light sources 8 in the enclosure 6 of the subject model 1. In this way, background light can be prevented from reaching the light detector 16.

In a preferred embodiment, the light detector 16 is a silicon photodiode. However, it will appreciated that other types of light detector may be used, for example other types of photodiode or photo transistors.

In preferred examples, the one or more light sources 8 in the enclosure are configured to emit light in the near infrared range, for example the light emitted by the one or more light sources 8 is preferably configured to have a peak emission wavelength of 950 nm. In this example the light detector 16 is preferably configured to detect near infrared light. For example, the light detector 16 is preferably configured to provide peak response at approximately 950 nm.

In this example, the window 22 of the probe head 14 preferably comprises a visible light filter that filters out visible light at lower wavelengths than the near infrared range. This can help to exclude background light from the readings.

Moreover, in radio-guided surgery, particularly in radio-guided laparoscopic surgery, it is common to use a camera probe and an LED lamp within the body cavity to provide the surgeon with a video feed as they operate. During simulation of radio-guided surgery there is a need to exclude light from the LED lamp from the simulated radio-guiding. Typically, the LED lamps will only emit light in the colder range of visible light (shorter wavelengths), and will not emit light in the near infrared range. Therefore, light from such an LED lamp can be filtered by the light filter at the window 22, and the intensity of the light from the LED lamp within the range of the light detector 16 should be limited. In this way, light from the LED lamp, and other background visible light in the enclosure 6 of the subject model 1, will only be detected by the light detector 16 as background noise or interference, which can be filtered out or ignored, allowing simulation of the radio-guided surgery.

The materials used for a probe for use in surgery are biocompatible materials, for example tungsten, stainless steel, tantalum or plastic. However, it will be appreciated that the probe 13 of the apparatus for simulating radio-guided surgery need not be made from biocompatible materials as it is not used in real surgery. Therefore, the probe 13 of apparatus for simulating radio-guided surgery can be cheaper than the real equivalents.

Figure 9:
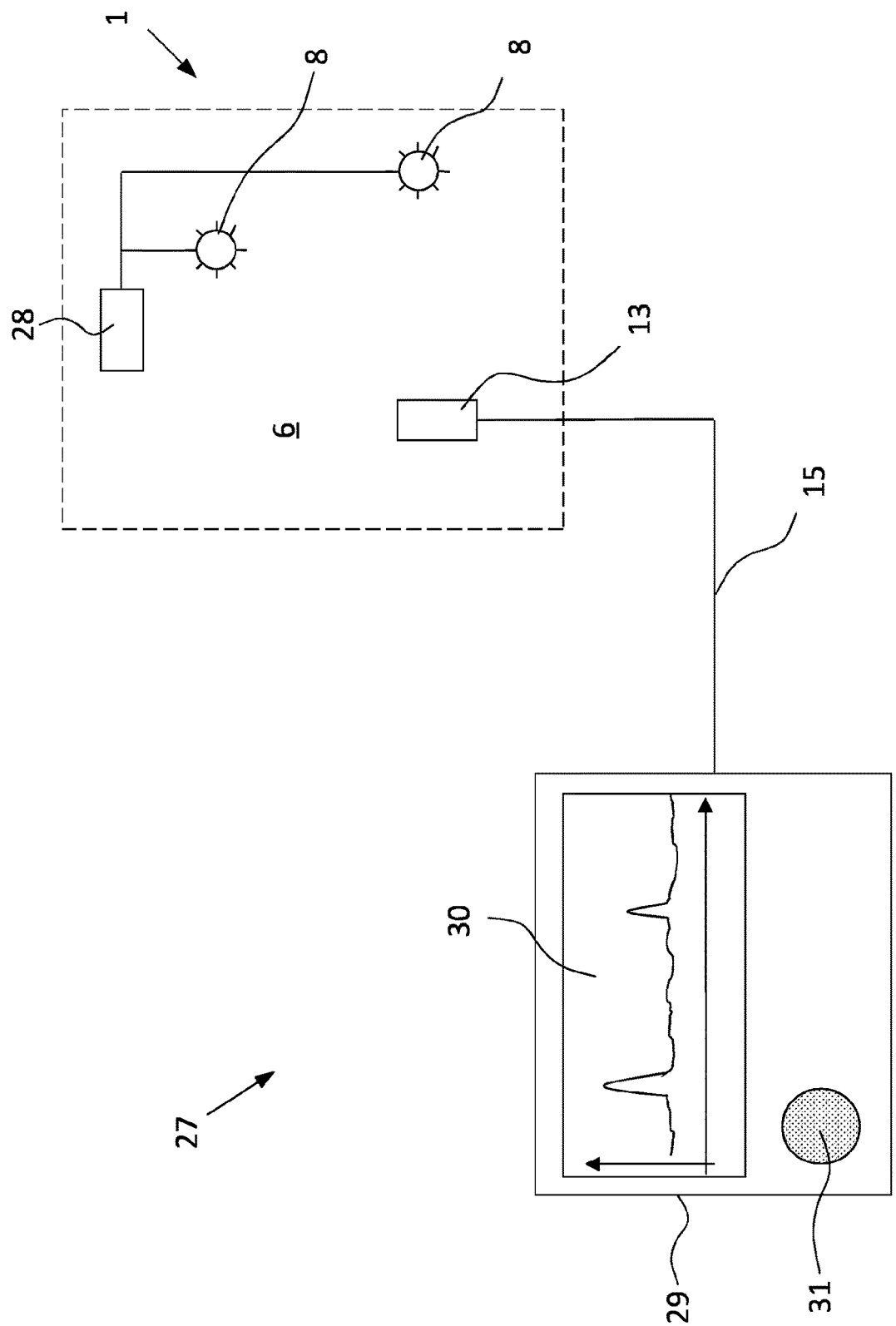
FIG. 9 shows a schematic diagram of apparatus for simulating radio-guided laparoscopic surgery, including a subject model and a laparoscopic probe.

As shown in FIG. 9, the apparatus 27 for simulating radio-guided surgery comprises the subject model 1 described with reference to FIGS. 1A to 5. The subject model 1 includes at least one light source 8. The subject model 8 also comprises a light control unit 28. The apparatus 27 for simulating radio-guided surgery also comprises a probe 13 that can be inserted into the enclosure 6 of the subject model 1 through an opening (4,5, see FIGS. 1A to 2B) in the subject model 1, in particular in the cover (3, see FIGS. 1A to 2B). The probe 13 includes a light detector (16, see FIGS. 7A to 8) that detects light from the one or more light sources 8 in the enclosure 6. Via the tether 15, the probe 13 sends a signal to the probe control unit 29, which will be described in further detail hereinafter.

When the probe 13 is inserted into the enclosure 6 of the subject model 1 the light detector detects 16 light from the one or more light sources 8. The light detector 16 outputs a signal to the probe control unit 29. The signal can have a voltage that is proportional to the intensity of light detected (within the configured wavelength range).

The probe control unit 29 is a computing device configured to receive the signal from the light detector 16. The probe control unit 29 is further configured to communicate data relating to detection of light to a user.

The probe control unit 29 comprises at least one communicator for communicating the signal received from the light detector 16 to the user. In the illustrated example, the probe control unit 29 comprises a visual display 30 for displaying an intensity of the light detected by the light detector 16. Also illustrated in this example, the probe control unit 29 comprises a loudspeaker 31 for generating a sound indicative of the light intensity detected by the light detector. Preferably, the communicator simulates the means of communication provided on an actual radio-guided probe, so that the simulation is accurate.

In various examples, the visual display 30 may show a current light intensity measurement, or it may form a representation of the light intensity across a wider field of view as the light detector 16 is moved within the probe head 14, as described previously.

The communicator communicates information to the user allowing them to determine the location of the light source within the enclosure.

Figure 10:
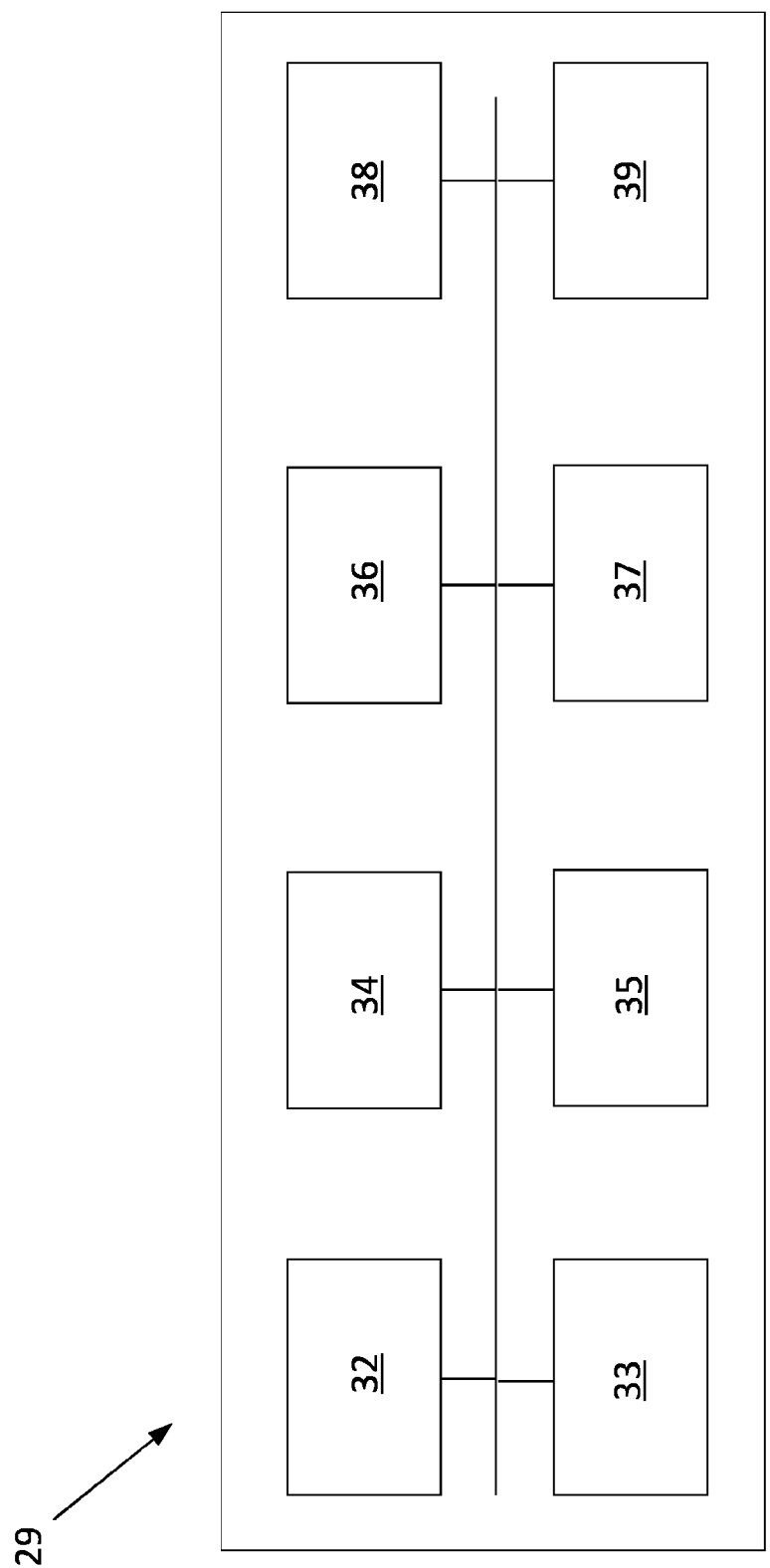
FIG. 10 shows a block diagram of a probe control unit for the laparoscopic probe.

FIG. 10 shows a system diagram for the probe control unit 29. Other architectures to that shown in FIG. 10 may be used as will be appreciated by the skilled person. In some embodiments, the probe control unit 29 may be remote from the probe 13. In some embodiments, the probe control unit 29 may comprise a computing system, which may be a distributed computing system.

Referring to FIG. 10, the probe control unit 29 may include a number of user interfaces including a communicator 32 and a virtual or dedicated user input device 33. In examples, the communicator 32 may comprise a visual display 30 or a loudspeaker 31. The probe control unit 29 may also include one or more of a processor 34, a memory 35 and a power system 36. The probe control unit 29 may additionally comprise a communications module 37 for sending and receiving communications between the processor 34 and a remote system. For example, the communications module 37 may be used to send and receive communications via a network such as the Internet. The communications module 37 may receive communications from a probe.

The probe control unit 29 may also comprise a port 38 for receiving, for example, a non-transitory computer readable medium containing instruction to be processed by the processor 34.

The probe control unit 29 may additionally comprise an analog-to-digital converter (ADC) 39 for converting an analog signal from the light detector (16, see FIGS. 7A to 8) into a digital signal for the processor 34.

The processor 34 can be configured to receive data, for example from the port 38, ADC 39 or communications module 37, access the memory 35, and to act upon instructions received either from the memory 35, from the communications module 37, from the port 38, or from the user input device 33. The processor 34 may be configured to receive a detection signal from the light detector 16 of the probe 13.

The skilled person would appreciate that one or more of the components of the probe control unit 29 may be integrated with the probe 13. The probe control unit 29 may be fully integrated with the probe 13. The probe control unit 29 may be remote from the probe 13.

During operation, the probe control unit 29 receives a signal from the light detector 16 in the probe (via a wire in the tether 15). The light detector 16 may generate an output voltage proportional to the intensity of light incident on the light detector 16. The analog-to-digital converter (ADC) 39 converts the analog signal from the light detector 16 into a digital signal, which is provided to the processor 34. The processor 34 sends a signal to the communicator 32, which communicates the signal to the user. The communicator 32 may be, for example, a visual display 30 or a loudspeaker 31, as described with reference to FIG. 9. Alternatively, the digital signal from the ADC 39 may be provided directly to the communicator 32.

The processor 34 may be configured to remove interference and/or background noise from the signal. The processor 34 may be configured to isolate peaks in the signal from the light detector 16 and send a signal indicative of only the peaks to the communicator 32.

FIGS. 12A and 12B show different example displays of a visual display 30 of the probe control unit 29. The example display units 30 display a graph indicative of the light detected by the light detector 16. In particular, the graph has a vertical axis 40 indicating detected light intensity (i.e. magnitude of the signal), and a horizontal axis 41 indicating position of the light detector 16. The graph thereby displays a spatial representation of light incident on the light detector 16.

In FIG. 12A, the light detector 16 has detected two distinct light sources 8a, 8b, as shown by the peaks in detected light intensity. One of the light sources 8a detected has a higher intensity than the other detected light source 8b, indicating either that it is closer to the light detector 16, or that it has more power.

In the example of FIG. 12B, the light detector 16 has detected two light sources 8a, 8b located close to each other, or nearly line with each other, as indicated by the twin peaks on the display 30. Such a reading may indicate a cluster of light sources.

Background light and other interference is shown on the example visual displays 30 in FIGS. 12A and 12B, but as explained above, in other examples the processor 34, or another component of the probe control unit 29, may be configured to remove this part of the signal.

Figure 11:
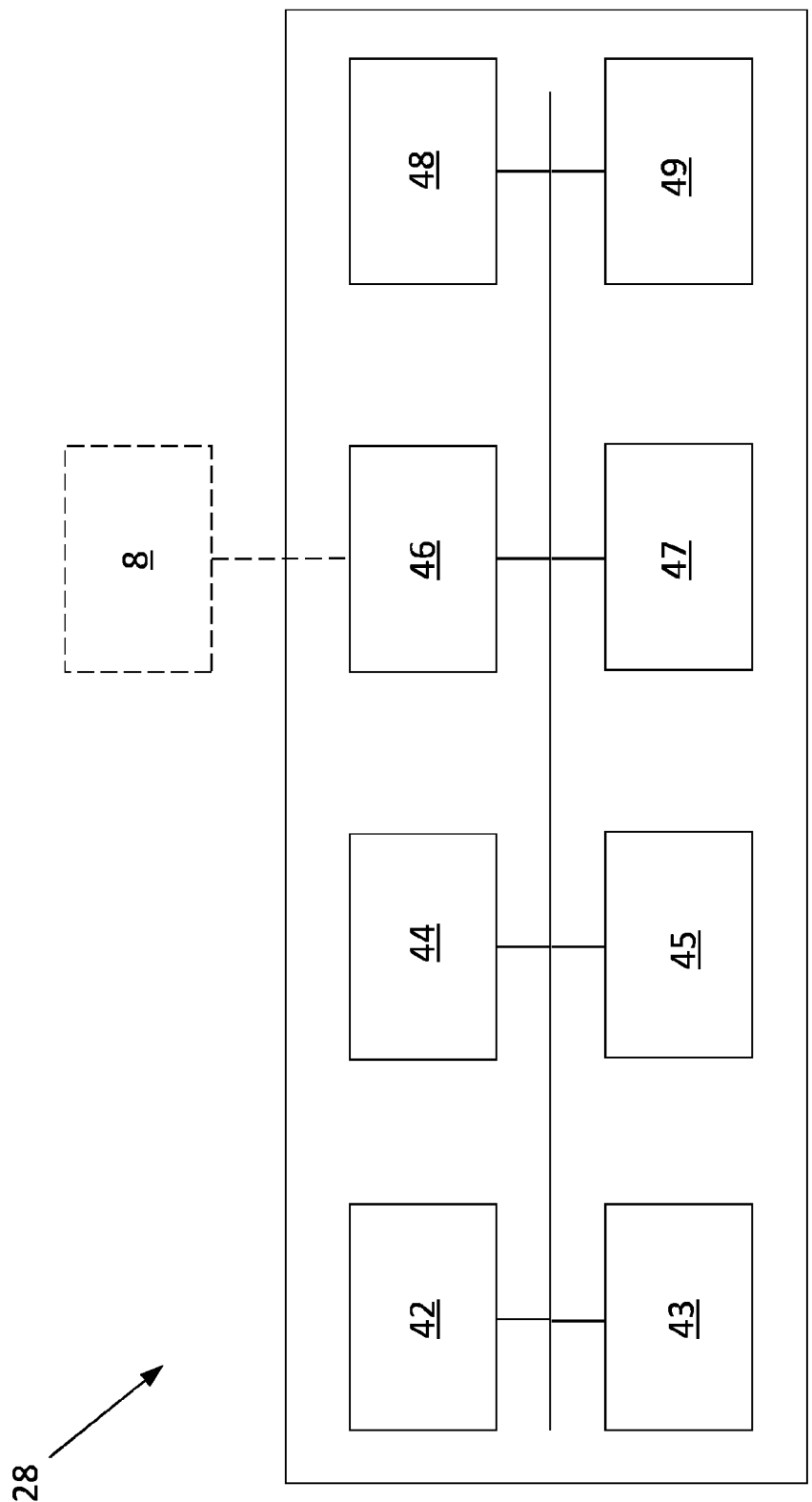
FIG. 11 shows a block diagram of a light control unit for the subject model.

FIG. 11 shows a system diagram for the light control unit 28 of the subject model 1 described with reference to FIGS. 1 to 5 and 9. The light control unit 28 is configured to control activation of the one or more light sources 8 in the subject model 1. The light control unit 28 controls the one or more light sources 8, including whether or not a light source 8 is activated (turned on), and at what power it is operated, which determines the intensity of light emitted. Other architectures to that shown in FIG. 11 may be used as will be appreciated by the skilled person. In some embodiments, the light control unit 28 may be remote from the subject model 1. In some embodiments, the light control unit 28 may comprise a computing system, which may be a distributed computing system.

Referring to FIG. 11, the light control unit 28 may include a number of user interfaces including a virtual or dedicated user input device 42. The light control unit 28 may also include one or more of a processor 43, a memory 44 and a power system 45. The light control unit 28 may comprise an output port 46, for outputting a signal to the one or more light sources 8. The light control unit 28 may additionally comprise a communications module 47 for sending and receiving communications between the processor 43 and a remote system. For example, the communications module 47 may be used to send and receive communications via a network such as the Internet. The communications module 47 may receive communications from the subject model 1.

The light control unit 28 may also comprise a port 48 for receiving, for example, a non-transitory computer readable medium containing instruction to be processed by the processor 43.

The light control unit 28 may additionally comprise a digital-to-analog converter (DAC) 49 for converting the digital signal from the processor 43 into an analog signal for the one or more light sources 8.

The processor 43 can be configured to receive data, access the memory 44, and to act upon instructions received either from the memory 44, from the communications module 47 or from the user input device 42. The processor 43 may be configured to generate an activation signal to the one or more light sources 8. In this way, the processor 43 generates an activation profile for the one or more light sources 8, and the one or more light sources 8 are operated according to the activation profile.

The skilled person would appreciate that one or more of the components of the light control unit 28 may be integrated with the subject model 1. The light control unit 28 may be fully integrated with the subject model 1. The light control unit 28 may be remote from the subject model 1. The light control unit 28 may be located in the recess 11 in the subject model 1 (see FIG. 5).

During operation, the processor 43 generates a signal, and the digital-to-analog convertor (DAC) 49 converts this signal into an analog signal for output to the one or more light sources 8 via port 46. The processor 43 may retrieve an activation profile from the memory 44, or the processor 43 may receive an activation profile from the user input device 42 or from the communications module 47, and the processor 43 may be configured to send signals for that activation profile to the DAC 49 and one or more light sources 8.

FIGS. 13A to 13D illustrate different example activation profiles for the one or more light sources 8. In each of FIGS.

13A to 13D the activation profile is represented by a graph. The vertical axis 50 of the graph is indicative of the power provided to the one or more light sources 8, which determines the intensity. The horizontal axis 51 is indicative of time.

In examples where the subject model 1 comprises a plurality of light sources 8, the activation profile may be configured to provide the same signal to all of the light sources 8, or different signals to each light source 8 or each group of light sources 8, as explained further below.

In some example activation profiles, the light control unit 28 activates the one or more light sources 8 at a constant intensity. For example, as illustrated in FIG. 13A, a single light source 8 can be provided with constant power to emit light at a constant intensity. In example activation profiles with a plurality of light sources 8, all of the light sources 8 can be provided with constant power to emit light at a constant intensity, as illustrated in FIG. 13A.

In some example activation profiles, a first light source 8a may be provided with a higher power than a second light source 8b, so that the first light source 8a emits light at a higher intensity light than the second light source 8b, as illustrated in FIG. 13B. In some example activation profiles, a first group of light sources 8a are operated at a first power, and a second group of light sources 8b are operated at a second power. The first group of light sources 8a may be arranged to simulate an internal anatomical feature, as illustrated in FIG. 3B, and the second group of light sources 8b may be distributed about the enclosure 6 to provide simulated background noise.

In further examples, the activation profile of the one or more light sources 8 is dynamic. That is, the intensity of at least one of the one or more light sources 8 varies over time. For example, the intensity of at least one of the one or more light sources 8 may be increased or decreased, or one or more light sources 8 may be changed between activated and deactivated conditions.

In examples where the subject model 1 comprises one light source 8, the activation profile can be configured to provide the light source 8 with varying power so that the intensity of light emitted varies over time, as illustrated in FIG. 13C. The activation profile may be configured to provide power to the light source 8 as a series of pulses 52, each pulse having a duration 53 for which the light source 8 is activated, and an interval 54 between pulses 52.

As illustrated in FIG. 13C, each pulse may have the same duration, and the intervals between pulses can be regular. For example, each pulse may have a duration of less than 10 milliseconds, and a 10 millisecond interval may be provided between each pulse. Preferably, each pulse may have a duration of approximately 2 milliseconds, and a 2 millisecond interval may be provided between each pulse.

In examples where the subject model 1 comprises a plurality of light sources 8, the light control unit 28 can be configured to provide each of the light sources 8 with the same activation profile, for example the activation profile illustrated in FIG. 13C. Alternatively, the light control unit 28 may be configured to provide a different activation profile to at least one of the light sources 8. In some examples, the light control unit 28 is configured to provide each of the light sources 8 with a different activation profile. In some examples, the plurality of light sources 8 may comprise a first group of light sources 8a provided with a first activation profile, and a second group of light sources 8b provided with a second activation profile. As illustrated in FIG. 3B, the first group of light sources 8a may be arranged to simulate an internal anatomical feature, and the second group of light sources 8b may be distributed about the enclosure 6 to provide simulated background noise.

In the example of FIG. 13C, the magnitude of each pulse 52 is the same for each light source 8. Alternatively, the magnitude of each pulse 52 may be different for at least one of the light sources 8. In one example, the magnitude of the pulse 52 is different for every light source, as shown in FIG. 13D.

In the example of FIG. 13D, the plurality of light sources 8a, 8b . . . 8n are sequentially pulsed for a duration 53, at intervals 54. In the illustrated case there are n light sources 8a, 8b . . . 8n in the subject model 1, illustrated as individual signals along the time aspect of the illustrated activation profile. Each light source 8a, 8b . . . 8n operates at a different intensity when activated. In this example, the pulse 52 of each light source 8a, 8b . . . 8n has a greater magnitude than the pulse 52 of the preceding light source 8n-1. In an example, the time period of each pulse is 2 milliseconds, and the interval between pulses is 2 milliseconds. The activation profile may repeat once finished. In an example with 10 light sources, as illustrated, the activation profile would be repeated every 40 milliseconds, meaning that each light source 8a, 8b . . . 8j is pulsed at intervals of 40 milliseconds.

It will be appreciated that the activation profile of the one or more light sources 8 may be varied in ways not described herein, but that the skilled person might consider when simulating radio-guided surgery. It will also be appreciated that each light source 8 can be operated according to its own activation profile, so the overall activation profile can vary in many ways. Preferably, the light control unit 28 can retrieve or receive one of a number of pre-determined activation profiles from a memory of the light control unit 28 or from an external source. For example, there may be different pre-determined activation profiles for different types of radio-guided surgery that is simulated.

As described above, preferably the light control unit 28 comprises a digital-to-analog converter (DAC) 49. The DAC 49 may be configured to convert the pulses of the activation profile into analog waveforms, in which case the duration of each pulse and the intervals between pulses will be analog approximations of the digital pulses, and so there will be some variation.

The light control unit 28, in particular the activation profile, is preferably configured to control the one or more light sources 8 to simulate radio-guided surgery. In particular, the light control unit 28 is preferably configured to control the one or more light sources 8 to provide a simulated area of higher intensity light, to simulate a concentration of radiopharmaceutical in a particular area of the subject model 1. Optionally, the light control unit 28 is further configured to control the one or more further light sources 8 to provide background light within the enclosure 6, to simulate background radiation that is commonly detected by a probe during radio-guided surgery.

In one example activation profile, the light control unit 28 is configured to control a first light source 8a to provide a source of higher intensity light, and a second light source 8b to provide background light. Such an activation In this example, the activation profile of the first light source 8a can comprise varying power over time, with pulses 52 of light such as that illustrated in FIG. 13C, and the second light source 8b can be provided with an activation profile having a constant power. In this example, it is possible for the probe control unit 28 to distinguish between light detected from the first light source 8a and light detected from the second light source 8b because of the different activation profiles.

In further examples, the subject model 1 is provided with a plurality of first light sources 8a and a plurality of second light sources 8b, as described above. The plurality of first light sources 8a may be arranged in a cluster.

The probe control unit 29 may be configured to distinguish between different light sources 8a, 8b . . . 8n according to the activation profile of that light source. For example, by pulsing every light source at a different frequency, the probe control unit 29 can separate the light detected from each light source 8a, 8b . . . 8n.

The apparatus simulates radio-guided surgery by using one or more light sources 8 in the subject model 1 in place of a radiopharmaceutical, and a light detector 16 on the probe 13, in place of a radiation detector. In preferred examples, the one or more light sources 8 are configured to emit light in a narrow range of wavelength, and the light detector 16 is configured to detect light in the same narrow range of wavelength. In this way, background noise can be reduced, and the probe control unit 29 can more easily detect the light emitted by the light source 8.

In one example, the range of wavelength emitted by the one or more light sources 8 and detected by the light detector 16 is non-visible. Preferably, the range of wavelength emitted by the one or more light sources 8 and detected by the light detector 16 is in the infrared range, more preferably the near infrared range.

Specifically, preferably the light emitted by the one or more light sources 8 has a wavelength that is greater than 10 nm, more preferably greater than 100 nm, more preferably greater than 1 micron. Preferably, the light has a wavelength that is less than 100 microns. In an advantageous example, the light is in the near infrared range, which has a wavelength of between 750 nm and 1400 nm, for example about 950 nm.

In laparoscopic surgery, and also in some kinds of open surgery, the surgeon commonly inserts a camera probe into the body cavity for video feedback. Such camera probes require light, so a lamp can also be inserted in the body cavity. When using the apparatus described herein to simulate radio-guided surgery it may include use of such a camera and lamp. It is preferable that the one or more light sources 8 operate at a wavelength in the near infrared range, as described above, so that the light emitted by the one or more light sources 8 does not interfere with the camera probe. In addition, the lamp will typically emit light at a different wavelength to the one or more light sources 8, allowing the light detector 16 to be configured to detect light from the one or more light sources 8, and not detect light from the lamp.

The apparatus for simulating radio-guided surgery may be used for training in radio-guided surgery. Specifically, the apparatus may be used to demonstrate the operation of the radio-guided probe and to allow surgeons and others to learn how to operate the probe and/or improve their use of the probe.

Alternatively, the apparatus may be used for testing different radio-guided equipment, such as different probes or associated parts, for example the control system or display. This may be used when developing new products, changing user interfaces, or improving any other aspect of radio-guided surgery equipment. The apparatus may also be used to demonstrate radio-guided surgery equipment.

In summary, there is provided apparatus for simulating radio-guided surgery, using a subject model 1 that includes a light source 8, and a probe 13 that includes a light detector 16 to detect light from the light source.

Variations of the described embodiments are envisaged, for example, the features of all the described embodiments may be combined in any way.

It is envisaged that the term "subject" as used herein may be any suitable subject. For example, the subject may be a human or may be an animal. A cavity of the subject may comprise, for example, an abdominal cavity of the subject.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. An apparatus for simulating radio-guided surgery, the apparatus comprising:
   a subject model comprising:
      an enclosure having an opening that extends from an exterior of the subject model into the enclosure,
      a model anatomical feature disposed within the enclosure,
      a light source disposed within the model anatomical feature, and
      a light control unit; and
   a probe for deployment by a user through the opening into the enclosure, the probe comprising a light detector configured to detect light emitted by the light source for localization of the light source within the enclosure.

2. The apparatus of claim 1, wherein the light source is embedded in a material that is transparent or translucent to a wavelength of light emitted by the light source.

3. The apparatus of claim 1, wherein the subject model comprises a plurality of light sources disposed within the enclosure and at least some of the plurality of light sources are grouped into a cluster of light sources.

4. The apparatus of claim 1, wherein the probe comprises a probe head for deployment by the user through the opening into the enclosure and the light detector is located in the probe head.

5. The apparatus of claim 4, wherein the probe further comprises a tether attached to the probe head.

6. The apparatus of claim 1, wherein the subject model comprises a base and a cover that define the enclosure, and the opening is formed in the cover.

7. The apparatus of claim 6, wherein the cover comprises a plurality of openings to simulate laparoscopic surgery or a single opening configured to simulate open surgery.

8. The apparatus of claim 1, wherein the light control unit is configured to control the light source.

9. The apparatus of claim 8, wherein the light source is configured to emit a constant intensity light.

10. The apparatus of claim 9, wherein the subject model comprises a plurality of light sources.

11. The apparatus of claim 8, wherein the light source is configured to emit a variable intensity light.

12. The apparatus of claim 11, wherein the subject model comprises a plurality of light sources, each of the plurality of light sources being configured to emit the variable intensity light.

13. The apparatus of claim 12, wherein the light control unit is configured to activate each of the plurality of light sources sequentially.

14. The apparatus of claim 13, wherein the light control unit is configured to provide an interval between the activation of successive light sources.

15. The apparatus of claim 12, wherein a peak intensity of a first light source of the plurality of light sources is different than a peak intensity of a second light source of the plurality of light sources.

16. The apparatus of claim 15, wherein the light control unit is configured such that every light source of the plurality of light sources has a different peak intensity when activated.

17. The apparatus of claim 1, wherein the probe further comprises a probe control unit configured to receive a signal indicative of the intensity of light detected by the light detector.

18. The apparatus of claim 17, wherein the probe control unit comprises a processor for processing the signal received from the light detector and the processor is configured to filter out background noise from the signal.

19. The apparatus of claim 17, wherein the probe control unit comprises a communicator configured to communicate an output to the user.

* * * * *